Nov. 25, 1969
E. F. BARTH ET AL
3,480,144
PROCESS FOR REMOVING PHOSPHORUS FROM WASTE WATER
Filed May 3, 1968
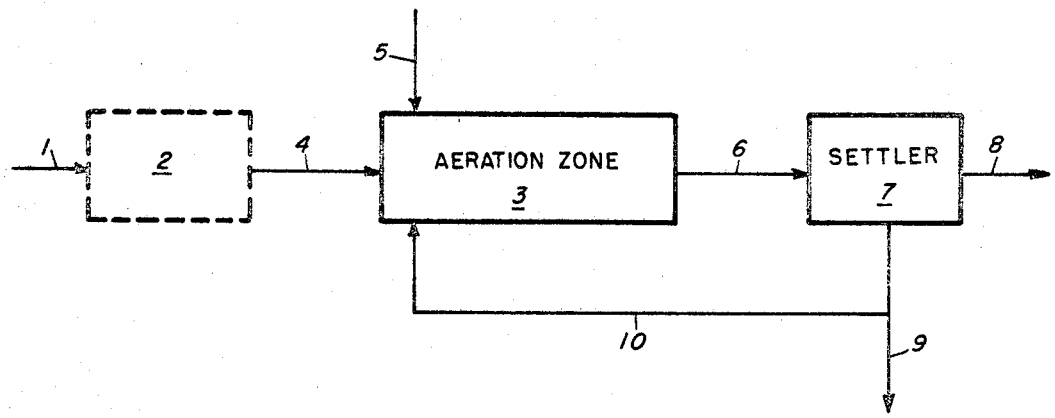
INVENTORS
**EDWIN F. BARTH
MORRIS B. ETTINGER**
BY
ATTORNEYS

United States Patent Office 3,480,144
Patented Nov. 25, 1969

3,480,144
PROCESS FOR REMOVING PHOSPHORUS
FROM WASTE WATER
Edwin F. Barth and Morris B. Ettinger, Cincinnati, Ohio, assignors to the United States of America as represented by the Secretary of the Interior
Filed May 3, 1968, Ser. No. 726,285
Int. Cl. C02c 1/06
U.S. Cl. 210—4                              9 Claims

ABSTRACT OF THE DISCLOSURE

Phosphates are removed from sewage streams treated by the activated sludge process by introducing phosphate precipitating ions directly into the aerating zone of the process.

---

This invention resulted from work done by the Federal Water Pollution Control Administration and the domestic title to the invention is in the Government.

Background of the invention

Industrial and domestic sewage wastes are commonly treated by activated sludge processes. Usually the raw sewage is subjected to a preliminary treatment which includes settling and removal of a primary sludge portion. The sewage is then treated in aeration basins in which the organic waste is partially oxidized and partially synthesized into microbial cells. The microorganisms, such as bacteria and protozoa, which develop during the aeration tend to flocculate into suspended clumps or masses. From the aeration basin, the sewage is discharged into a secondary sedimentation basin where the flocculated microorganism masses along with other suspended solids settle to form a sludge. It is conventional to recycle a portion of this biologically active sludge to the aerator basins in order to serve as an inoculum for the incoming raw sewage.

While this process results in a substantial reduction in chemical oxygen demand of the sewage treated, it is not effective to remove dissolved mineral constituents such as phosphorus. Phosphates, along with nitrates, are one of the major factors contributing to progressive stream and lake fertilization. Fertilization of the receiving waters tends to promote blooms in aquatic vegetation, particularly algae. Such blooms seriously degrade the quality of water and may even prove toxic to other aquatic life. The ultimate development of blooms is limited by the availability of nutrients, especially nitrogen and phosphorus. Thus, reduction of available phosphorus, nitrogen, or both results in a limitation on undesirable algae growth.

Phosphorus in domestic sewage is derived from organic wastes and from chemical sources; particularly from phosphate-containing detergents. Removal of phosphate from sewage can be accomplished in various ways. The two main approaches to such removal are by biological synthesis and by chemical treatment such as precipitation of phosphorus in an insoluble compound. In the case of biological synthesis, conversion of phosphorus to cellular material is optimized by rigorous control of conventional operating parameters or by a tertiary treatment of the sewage plan effluent such as by algae culture in a lagoon. Chemical removal of phosphorus is often accomplished by precipitation as the phosphate using aluminum, iron, calcium or magesium salts as the precipitating agents. Usually such removal is performed as a tertiary treatment of the sewage plant effluent.

Tertiary treatment of sewage effluents to remove soluble phosphates by adding a precipitating cation would appear to be a relatively simple and economic process. It is well known that cations such as those of aluminum, ferrous and ferric iron, copper, magnesium and calcium produce essentially insoluble phosphates and that the reaction is essentially stoichiometric. However, sewage wastes usually contain from about 2 to about 20 p.p.m. of phosphate. At these concentration levels, it is necessary to use a very large excess of the precipitating cation to achieve phosphate removal levels of 90 to 99%.

Lea et al. (Sewage and Industrial Wastes, vol. 26, pages 261–275, 1954) show that a precipitating cation dosage of about 200 p.p.m. is necessary to achieve 96–99% phosphate removal from a sewage plant effluent containing 5 to 6 p.p.m. phosphate. This is about 6 to 10 times as much coagulant as is ordinarily used in the clarification of surface water for use as potable water. Precipitants used included alum, ferrous and ferric sulfate and copper sulfate. They further showed that phosphate removal at these concentrations occurred primarily through adsorption rather than by chemical precipitation.

It has now been found that an essentially stoichiometric removal of low concentrations of phosphorus may be obtained if the phosphate precipitating ion is reacted with sewage wastes in an oxygen and biological solids-rich environment. Since this environment is normally present in the aeration zone of a conventional activated sludge process, the invention may be practiced simply by adding precipitating ions directly to that zone.

This invention comprises a method for phosphorus removal in an activated sludge waste treatment process which combines the advantages of biological synthesis and chemical treatment.

The primary object of this invention is to remove phosphate contained in sewage and other waste waters.

Another object of this invention is to produce a sewage sludge containing enhanced concentrations of phosphorus.

A further object of the invention is to simplify the equipment required to operate an activated sludge process while concomitantly increasing its efficiency in phosphate removal.

Another object of the invention is to simultaneously treat sewage wastes by biological synthesis and by chemical reaction.

Detailed description of invention

The process will be more clearly understood from the following description of a preferred embodiment wherein reference is made to the accompanying drawing.

The drawing comprises a flow diagram of the phosphate removal process of this invention.

A raw sewage influent stream 1, typically containing about 20 p.p.m. soluble phosphates, is optionally subjected to primary settling at 2 and is then passed to aeration basin 3 by means of conduit 4. Aeration basin 3 comprises any conventional design which combines intimate mixing and contact of the sewage stream with air and sufficient detention time to allow substantial oxidation and biological synthesis of the organic material contained in the sewage stream.

A phosphate-precipitating ion is introduced into the aeration basin at 5. The natural agitation of the aeration basin provides sufficient mixing action to thoroughly disperse the ion in the solution and slurry. After aeration, the sewage stream is passed via conduit 6 to final settler 7 which is of conventional design. A treatment sewage effluent stream is removed from the settler via line 8 and may be subjected to chlorination and disposal in a conventional manner. The sludge fraction is removed from settler 7 via line 9. A portion of the sludge fraction is recycled to the head of the aeration basin by means of conduit 10.

EXAMPLE 1

A 100 gallon per day continuous flow, activated sludge pilot plant was used to determine the efficiency of various ions for precipitating phosphate. A stream of raw domestic sewage was fed directly into a spiral flow aeration chamber without primary settling. Theoretical detention time of the aerator, based on influent flow, was 6 hours. Aerated sewage was then passed to a settler and a stream of sludge was recycled back to the aerator.

A solution of the precipitating ion was metered directly to the head of the aeration chamber and was immediately mixed by the turbulence caused by aeration. Representative samples of the sewage influent and settler effluent were collected over a 24-hour period and analyzed for phosphorus. Results of these tests are set out in the following table:

TABLE 1

| Test No. | Reactant | Reactant concentration (mg./l.) | Overall phosphorus removal, percent | pH |
|---|---|---|---|---|
| 1 | None | | 40 | 7.2–7.5 |
| 2 | CaO | 150 | 64 | 7.2–7.5 |
| 3 | CaO + NaF | 150 / 6 | 75 | 7.2–7.5 |
| 4 | $MgSO_4$ | 20 | 50 | 7.2–7.5 |
| 5 | $FeCl_3$ | 15 | *75 | 6.0–6.2 |
| 6 | $Al_2(SO_4)_3$ | 20 | *70 | 6.0–6.2 |
| 7 | $Al_2(SO_4)_3$ + CaO | 30 / 20 | 90 | 7.2–7.5 |

*Turbid effluent.

Results reported in the table are average results of 24-hour composite samples taken over a 2-week period. Test No. 1 is a baseline period and represents the removal of phosphorus by cellular growth. As shown by the table, ions of iron and aluminum were particularly effective to remove phosphorus from the sewage. Maintenance of the aeration basin in a neutral or slightly alkaline range also improved the phosphorus removal efficiency.

EXAMPLE 2

Use of aluminum as a precipitating ion at neutral or slightly alkaline conditions was further investigated using the same pilot plant arrangement and sewage feed as that of Example 1. The following data was obtained:

Test No. 1 shows that a mixture of aluminum, introduced as the sulfate, and lime effectively reduce the phosphorus content of the final effluent. Lime was added to neutralize the acidity produced by hydrolysis of the aluminum sulfate. This combination of chemicals introduces extraneous sulfate and calcium ions which may be undesirable. Aluminum introduced in the form of an aluminate compound, preferably sodium aluminate, avoids this problem.

Tests 1–4 were performed without primary settling in the manner of the tests of Example 1. Tests 5 and 6 differed only in that primary settling was utilized. As may be seen from the table, some phosphorus was removed by the primary settler but overall phosphorus removed by the system remained essentially the same. Elimination of primary settling is not essential to the process but may be generally advantageous for economic as well as for process reasons. Elimination of the primary settler lowers both capital and operating costs. In those cases where available carbon or nitrogen limits the maximum removal of phosphorus by biological synthesis, operating the process without primary settling will enhance the carbon:nitrogen:phosphorus ratio and will promote cellular growth.

As shown by Table 2, a roughly stoichiometric ratio between the precipitating ion and phosphorus results in efficient phosphate removal. However, a mol ratio of precipitating ion to phosphorus as low as about 0.5 may be used with good results. A mol ratio of precipitating ion to phosphorus above about 1.5 fails to increase the phosphorus removal efficiency of the process.

At this point, it is impossible to define the relative contribution of simple chemical precipitation and that of biological synthesis and adsorption of the activated sludge mass to overall phosphorus removal. Sorptive capacity of the sludge may not be critical as shown by the fact that use of primary settling with its attendant decrease in aeration solids did not significantly alter the process efficiency. On the other hand, quantity of precipitating cation needed was far less than that required for a separate unit operation without biological solids. This would indicate that the large surface area of the biological floc contributes significantly to the process.

A further comparison was made of the activated sludge process operating with and without addition of aluminum ion to the aerator. The following results were obtained:

TABLE 3

| | Overall removal, percent | | | |
|---|---|---|---|---|
| Aluminum added | Chemical oxygen demand | Suspended solids | Nitrogen | Phosphorus |
| No | 89 | 95 | 40 | 40 |
| Yes | 92 | 96 | 35 | 94 |

It is clear from these data that aluminum addition does

TABLE 2

| Text No. | Reactant | Aluminum concentration, mg./l. | Primary settling | P(mg./l.) raw sewage | P(mg./l.) aerator influent | P(mg./l.) final effluent | P removal (percent) |
|---|---|---|---|---|---|---|---|
| 1a | $Al_2(SO_4)_2$ + CaO | 5 / 11 | No | 3.5 | 3.5 | 0.4 | 94 |
| 1b | | | | 3.2 | 3.2 | .2 | |
| 1c | | | | 10.7 | 10.7 | .2 | |
| 1d | | | | 3.6 | 3.6 | .2 | |
| 2a | $NaAl(OH)_4$ | 5 | No | 3.7 | 3.7 | 0.2 | 94 |
| 2b | | | | 2.7 | 2.7 | .2 | |
| 2c | | | | 2.6 | 2.6 | .2 | |
| 2d | | | | | | .2 | |
| 3a | $NaAl(OH)_4$ | 5 | No | 11.5 | 11.5 | 2.5 | 75 |
| 3b | | | | 10.9 | 10.9 | 2.4 | |
| 3c | | | | 10.9 | 10.9 | 3.6 | |
| 3d | | | | 11.3 | 11.3 | 3.1 | |
| 4a | $NaAl(OH)_4$ | 10 | No | 16.6 | 16.6 | 0.9 | 95 |
| 4b | | | | 10.3 | 10.3 | .5 | |
| 4c | | | | 9.0 | 9.0 | .4 | |
| 4d | | | | 10.8 | 10.8 | .5 | |
| 5a | $NaAl(OH)_4$ | 10 | Yes | 15.8 | 13.0 | 0.7 | 94 |
| 5b | | | | 11.5 | 9.0 | .6 | |
| 5c | | | | 10.1 | 8.6 | .8 | |
| 5d | | | | 8.4 | 7.6 | .6 | |
| 6a | $NaAl(OH)_4$ | 10 | Yes | 12.4 | 10.9 | 0.9 | 95 |
| 6b | | | | 13.5 | 11.5 | .5 | |
| 6c | | | | 11.6 | 8.8 | .7 | |
| 6d | | | | 10.5 | 8.4 | .3 | | not interfere with biological nitrification or carbon and solids removal. In both cases, aluminum content of the final effluent was less than 1 mg. per liter.

EXAMPLE 3

Waste activated sludge produced by the process was subjected to anaerobic digestion. A non-mixed digester was operated exclusively on the aluminum containing sludge for 6 times the theoretical detention period. Gas production was on the order of 500 to 600 ml. gas per g. of volatile solids fed. Phosphorus content of the digester supernatant was 10 mg./l. and the digested sludge solids contained 480 mg./l. phosphorus. In the anaerobic digestion of sludges from conventional activated sludge processes, phosphorus content of the digester supernatant usually ranges from 50 to 100 mg./l. This indicates that the phosphorus compounds formed in the process retain their identity through anaerobic digestion.

As has been shown in the examples, this process offers the following advantages as compared to a conventional activated sludge process:

(1) Quantity of precipitating ion required is far less than that necessary in a separate tertiary treatment.

(2) The primary settler may be eliminated along with its attendant capital and operating costs.

(3) The large surface area of microbial floc in the aerator is utilized as reactive or adsorptive sites.

(4) Dual use is made of the aerator detention time and turbulence.

(5) Phosphorus removal is equal to or greater than that achieved by tertiary treatment of a conventional effluent.

While there have been shown and described the novel features of the invention as applied to a preferred embodiment, it will be understood that other forms and applications will be obvious to those skilled in the art. It is the intention, therefore, to be limited only as indicated by the scope of the following claims.

What is claimed is:

1. A process for removing normally soluble phosphates from a waste sewage stream which comprises:
   (a) intimately contacting a sewage stream, containing from about 2 to about 20 p.p.m. of soluble phosphate, in an aerating zone with an oxygen containing gas for a time sufficient to promote conversion of a major portion of organic waste contained in said sewage to oxidized and biologically synthesized forms,
   (b) introducing into said aerating zone about 0.5 to about 1.5 parts of a phosphate precipitating ion per part of phosphorus contained in said sewage entering the aeration zone and maintaining said aerating zone at neutral to slightly alkaline conditions,
   (c) passing said aerated sewage stream to liquid-solids separation zone, and
   (d) removing from said separation zone a clarified water stream and a sludge fraction containing phosphorus compounds.

2. The process of claim 1 wherein said phosphate precipitating ion chosen from the group consisting of $Fe^{+++}$ and $Al^{+++}$.

3. The process of claim 2 wherein said ion is $Al^{+++}$.

4. The process of claim 3 wherein said aluminum ion is added to said aerating zone as an aluminate compound.

5. The process of claim 4 wherein said aluminate compound is sodium aluminate.

6. The process of claim 1 wherein a portion of said sludge fraction is recycled as a biological inoculum to said aerating zone.

7. The process of claim 6 wherein said phosphate precipitating ion is chosen from the group consisting of $Fe^{+++}$ and $Al^{+++}$.

8. The process of claim 7 wherein said ion is $Al^{+++}$ and is added in the form of an aqueous solution of an aluminate compound.

9. The process of claim 8 wherein said aluminate compound is sodium aluminate.

References Cited

UNITED STATES PATENTS

| | | | |
|---|---|---|---|
| 3,385,785 | 5/1968 | Forrest et al. | 210—18 X |
| 3,386,911 | 6/1968 | Albertson | 210—18 |
| 3,423,309 | 1/1969 | Albertson | 210—18 X |

OTHER REFERENCES

Lindsay, F. K., et al.: Removal of Silica etc., Ind. and Eng. Chem., vol. 31, July 1939, pp. 859–861.

Phelps, E. B., et al.: A Laboratory Study etc., Sewage Works Journal, vol. 14, January 1942, pp. 104–120 (P.O.S.L.).

Tenney, M. W., et al.: Chemical Flocculation etc., Journal WPCF, vol. 37, October 1965, pp. 1370–1388 (P.O.S.L.).

MICHAEL E. ROGERS, Primary Examiner

U.S. Cl. X.R.

210—18